(12) United States Patent
Lafont

(10) Patent No.: US 7,780,113 B1
(45) Date of Patent: Aug. 24, 2010

(54) ASSEMBLY FOR AN AIRCRAFT INCLUDING A WING ELEMENT AND A SUSPENSION PYLON

(75) Inventor: Laurent Lafont, Pechbusque (FR)

(73) Assignee: Airbus France, Toulouse (FR)

( * ) Notice: Subject to any disclaimer, the term of this patent is extended or adjusted under 35 U.S.C. 154(b) by 224 days.

(21) Appl. No.: 11/525,018

(22) Filed: Sep. 22, 2006

(30) Foreign Application Priority Data

Sep. 26, 2005 (FR) .................................... 05 52870

(51) Int. Cl.
B64D 27/18 (2006.01)
B64D 27/26 (2006.01)
B64D 27/00 (2006.01)

(52) U.S. Cl. ......................................................... 244/54
(58) Field of Classification Search ............... 244/53 R, 244/54, 55, 66; 248/554; 60/796, 797
See application file for complete search history.

(56) References Cited

U.S. PATENT DOCUMENTS

| | | | |
|---|---|---|---|
| 3,831,888 A | 8/1974 | Baker et al. | |
| 3,848,832 A | 11/1974 | Stanley et al. | |
| 3,948,469 A * | 4/1976 | Brown | 244/54 |
| 4,266,741 A | 5/1981 | Murphy | |
| 6,126,110 A * | 10/2000 | Seaquist et al. | 244/54 |
| 2005/0082423 A1* | 4/2005 | Whitmer et al. | 244/54 |
| 2005/0269444 A1* | 12/2005 | Marche | 244/54 |

OTHER PUBLICATIONS

U.S. Appl. No. 12/067,192, filed Mar. 18, 2008, Lafont, et al.
U.S. Appl. No. 12/066,916, filed Mar. 14, 2008, Lafont.

* cited by examiner

*Primary Examiner*—Tien Dinh
*Assistant Examiner*—Richard R Green
(74) *Attorney, Agent, or Firm*—Oblon, Spivak, McClelland, Maier & Neustadt, L.L.P.

(57) ABSTRACT

The invention relates to an assembly for an aircraft comprising a wing element (2) and a suspension pylon (4) for an engine (10) under the wing element, the suspension pylon (4) comprising a rigid structure (6) forming a box provided with an aft closing element (28), and the wing element (2) having a forward spar (34) extending substantially parallel to a leading edge (30) of the wing element. According to the invention, the rigid structure is assembled on the wing element such that the aft closing element bears in contact with the forward spar (34).

6 Claims, 3 Drawing Sheets

ASSEMBLY FOR AN AIRCRAFT INCLUDING A WING ELEMENT AND A SUSPENSION PYLON

TECHNICAL DOMAIN

This invention relates in general to an assembly for an aircraft comprising a wing element and an engine suspension pylon under said wing element.

Such an assembly may be used for any type of aircraft, for example aircraft with turbo-engines suspended from the wing, such as turbojets or turboprops.

STATE OF PRIOR ART

On existing aircraft, turbo-engines are suspended below the wing by complex mounting devices, also called EMS (Engine Mounting Structure), or suspension pylon. For turbojets, the mounting devices usually used comprise a rigid box structure, in other words formed by the assembly of upper and lower spars connected to each other through a plurality of transverse ribs.

In a known manner, these pylons are designed particularly to transmit static and dynamic forces generated by the turbo-engines such as the weight, thrust or the different dynamic forces, to the wing.

In this respect, forces are usually transmitted between suspension pylons known according to prior art and the wing by a forward attachment, an aft attachment and an intermediate attachment designed particularly to resist thrust forces generated by the associated turbo-engine.

To achieve this, the intermediate attachment that will resist thrust forces, also called a spigot attachment, is generally materialised by a ball joint fixed in the aft upper spar of the rigid structure, between the forward attachment and the aft attachment. This spigot attachment also comprises a shear pin located under the aircraft wing through a clamping fitting, so as to fit into the above-mentioned spigot attachment.

On recent aircraft turbo-engines, the large dilution ratio required results in an extremely large overall dimension, because increasing the dilution ratio inevitably increases the engine diameter, and also more particularly increases the diameter of its fan case.

Thus, with a ground clearance that is naturally fixed so as to remain acceptable from a safety point of view, the space remaining between the wing and the turbo-engine to hold the suspension pylon and the different attachments is becoming increasingly restricted, while paradoxically the forces to be resisted are becoming increasingly high.

This development of turbo-engines has the unfortunate consequence of reducing the vertical dimensions of the suspension pylon, particularly to maintain sufficient space to put the clamping fitting of the intermediate attachment into place, for which large dimensions are necessary in order to resist the turbo-engine thrust forces, in other words forces along the longitudinal direction of the turbo-engine, and forces along the transverse direction of the turbo-engine.

OBJECT OF THE INVENTION

Therefore the purpose of the invention is to propose an assembly for an aircraft overcoming problems with the overall size and reduction of the suspension pylon dimensions encountered in assemblies according to prior art.

To achieve this, the object of the invention is an assembly for an aircraft comprising a wing element and an engine suspension pylon under the wing element, the suspension pylon comprising a rigid structure forming a box provided with an aft closing element, and the wing element having a forward spar extending substantially parallel to a leading edge of the wing element. According to the invention, the rigid structure is assembled on the wing element such that the aft closing element bears in contact with the forward spar of the wing element, the rigid structure partially penetrating inside the wing element.

Thus, it is understandable that the special feature of the invention lies in the fact that the rigid structure of the suspension pylon penetrates partially into the wing element, and more particularly into a part forming the leading edge located forward from a main part forming a box delimited in the forward direction by the forward spar, such that the aft closing element of the box may be installed fixed on the forward spar of the wing element with which it is in bearing contact. Therefore, this is completely different from layouts according to prior art in which the entire rigid structure was below the wing element, and in which only the attachments penetrated into this element.

Consequently, for a given spacing between a turbo-engine and its associated wing element, the space allocated for the layout of the suspension pylon is significantly greater than the space available in assemblies according to prior art, simply due to partial and local penetration of the rigid structure inside the wing element.

Consequently, the assembly according to the invention enables larger dimensions of suspension pylons, so that they can be better adapted to the high forces that they are designed to resist.

Furthermore, note that this solution no longer uses conventional attachments like those described in the state of prior art, considering that in the preferable required, the entire rigid structure forming a box is located in front of the forward spar of the wing element. Fastening means for fixing the rigid structure onto the wing element can then be entirely laid out at the closing element that is normally vertical, and are no longer partially added on the upper spar of the box as was the case previously with the spigot type intermediate attachment. Thus, the presence of these fastening means does not increase the size in the vertical direction, so that the dimensions of the suspension pylon and/or the ground clearance can be further increased.

Preferably, the aft closing element is in contact with the forward spar of the wing element over its entire outside surface or over only part of this surface.

If this aft closing element extends downwards beyond the forward spar of the wing element, it can be predicted that this aft closing element is also in bearing contact with a support fitting located below the forward spar, and fixed to this forward spar.

In another preferred embodiment of this invention, the aft closing element is in contact with a support fitting inserted between the forward spar and this aft closing element of the rigid structure. In this configuration, it would be possible that this support fitting extends downwards beyond the forward spar.

Preferably, the assembly comprises mounting means for fastening the rigid structure onto the wing element, these means comprising two lateral shear pins and a plurality of tension bolts. This solution may advantageously be used to produce mounting means forming a statically determinate mounting system, but in particular it guarantees perfect interchangeability for the suspension pylon.

Furthermore, note that the closing element may indifferently be a partition or a rib in the form of a frame, preferably oriented substantially in the vertical direction parallel to the leading edge.

Finally, another purpose of the invention is an aircraft with at least one assembly like the assembly that has just been described.

Other advantages and characteristics of the invention will become clearer from the non-limitative detailed description given below.

BRIEF DESCRIPTION OF THE DRAWINGS

This description will be made with reference to the appended drawings wherein.

DETAILED DESCRIPTION OF PREFERRED EMBODIMENTS

Figure 1:
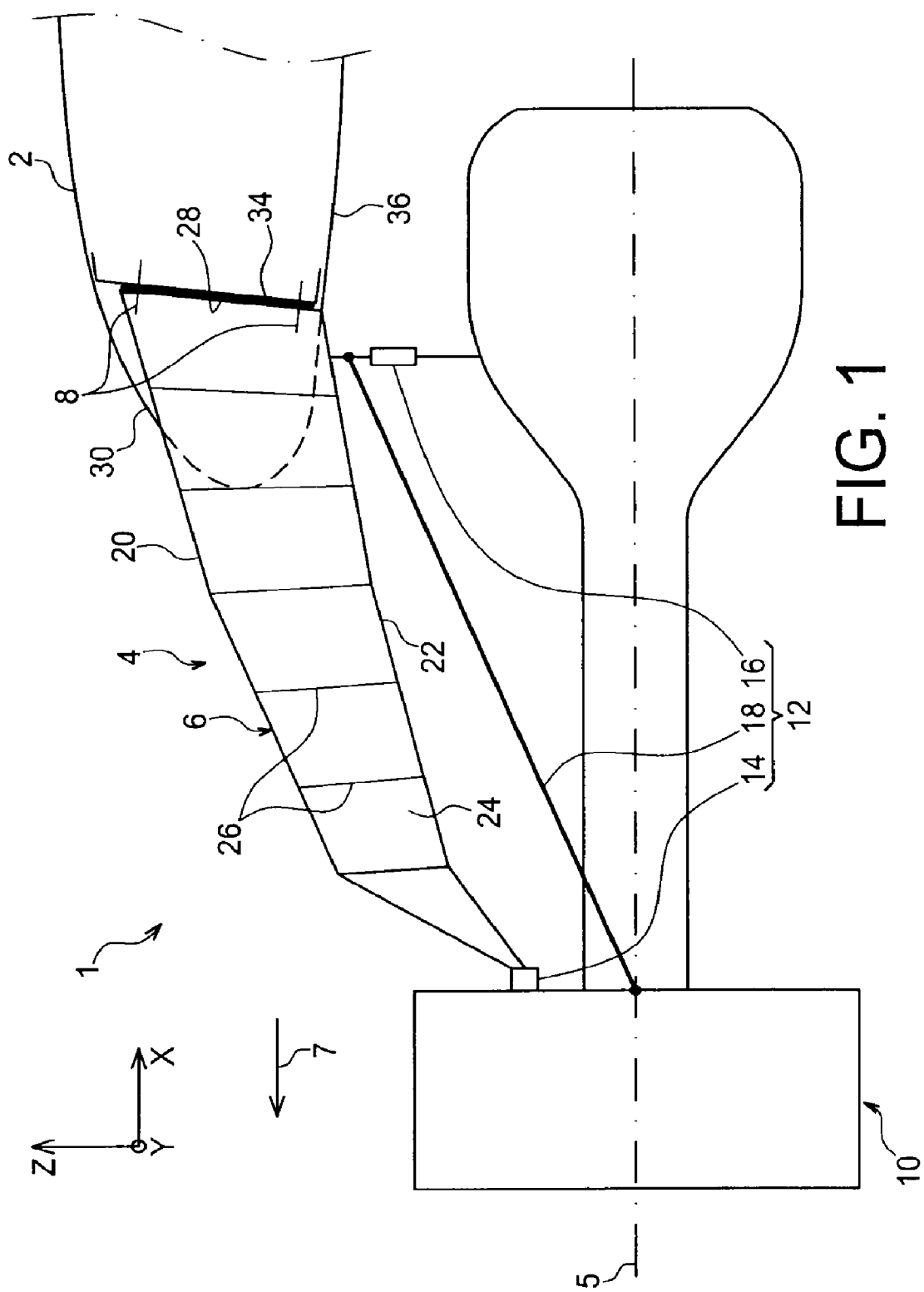
FIG. 1 shows a side view of an assembly for an aircraft according to a first preferred embodiment of this invention.

With reference to FIG. 1, the figure shows an assembly 1 for an aircraft according to a first preferred embodiment of this invention.

Globally, this assembly 1 comprises a wing element 2 such as a wing, a suspension pylon 4 for an engine 10 such as a turbojet, and means 8 of fastening a rigid structure 6 forming the box of the pylon 4 on the wing element 2.

Furthermore, this FIG. 1 also shows fastening means 12 inserted between the rigid structure 6 and the turbo-engine 10 for guidance, these means 12 being composed of one or several forward engine attachments 14, one aft engine attachment 16 and a thrust resistance device 18 provided essentially with lateral resistance rods.

These fastening means 12 do not form part of this invention and consequently will not be described further.

Throughout the following description, by convention, X refers to the longitudinal direction of the pylon 4 that is also referred to as the longitudinal direction of the turbojet 10, this direction X being parallel to a longitudinal axis 5 of this turbojet 10. Furthermore, the direction transverse to the pylon 4 is called Y and can be considered to be the same as the transverse direction of the turbojet 2, and Z is the vertical direction or the height, these three X, Y and Z directions being orthogonal to each other.

Furthermore, the terms <<forward>> and <<aft>> should be considered with respect to a direction of movement of the aircraft that occurs as a result of the thrust applied by the turbo-engines 10, this direction being shown diagrammatically by the arrow 7.

Still with reference to FIG. 1, it can be seen that only the rigid structure forming the box 6 of the suspension pylon 4 has been shown, with means 8 for fastening this rigid structure under the wing element 2. The other constituents not shown of this pylon 4, such as the secondary structure segregating and holding the systems while supporting aerodynamic fairings, are conventional elements identical to or similar to those used in prior art, and known to those skilled in the art. Consequently, no detailed description of them will be made.

Similarly, note that the rigid structure 6, also called the primary structure, is similar to the structures encountered in the devices according to prior art. Thus it is effectively of the "box" type, in other words it is formed by the assembly of the upper spar 20 and the lower spar 22 and two side panels 24 (only one being shown due to the side view), these elements 20, 22, 24 being connected to each other through transverse ribs 26 that are normally oriented along parallel planes YZ.

Furthermore, at the back of the rigid structure 6, the structure has an aft closing element that may indifferently be in the form of a partition, in other words a plate type element entirely closing the box, or a frame shaped rib, in other words with an opening near its middle and therefore only partially closing this same box. This element 28 is preferably substantially in the vertical direction and is fixed to each of the elements 20, 22, 24 of the box 6. Preferably and unlike the other ribs 26, this closing element 28 is oriented parallel to the leading edge 30, namely parallel to a width direction 32 of the wing 2 (shown diagrammatically in FIG. 2), this direction 32 being located in an XY plane and inclined with respect to these two directions X and Y.

Therefore the special feature of the invention is due to the fact that this closing element 28 is in bearing contact with a forward spar 34 of the wing element 2, this spar 34 normally extending along the width direction 32.

Figure 2:
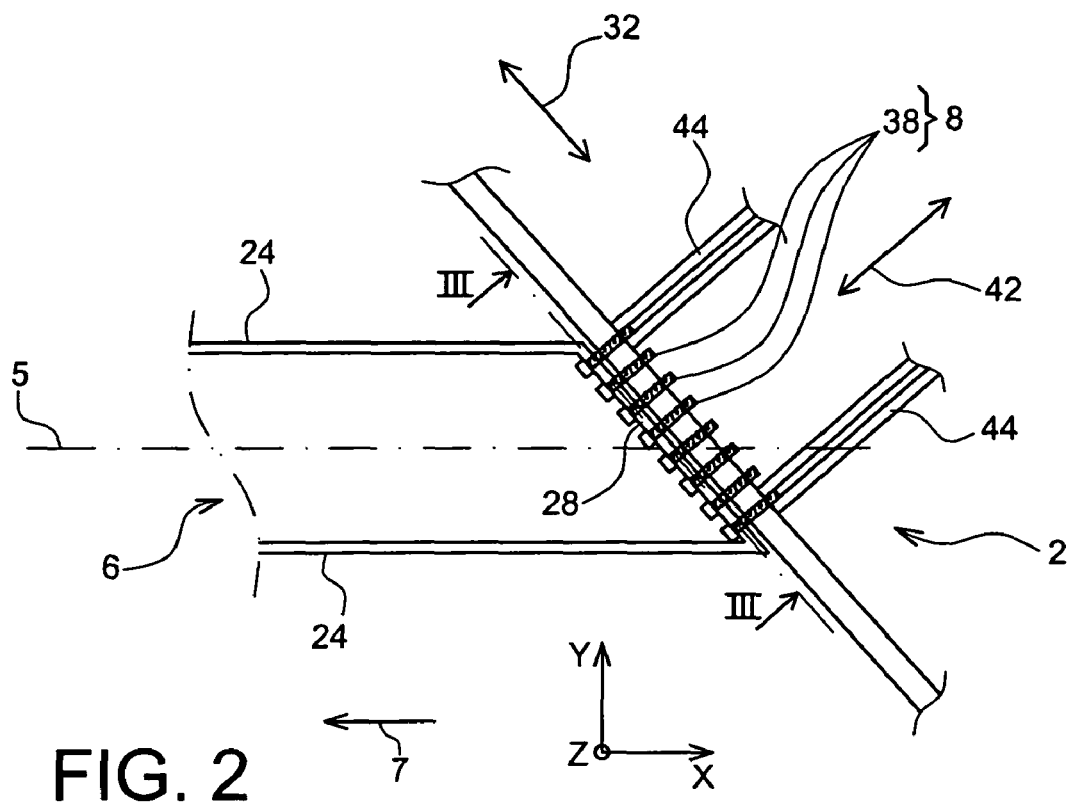
FIG. 2 shows a partial top view of the assembly shown in FIG. 1.
Figure 3:
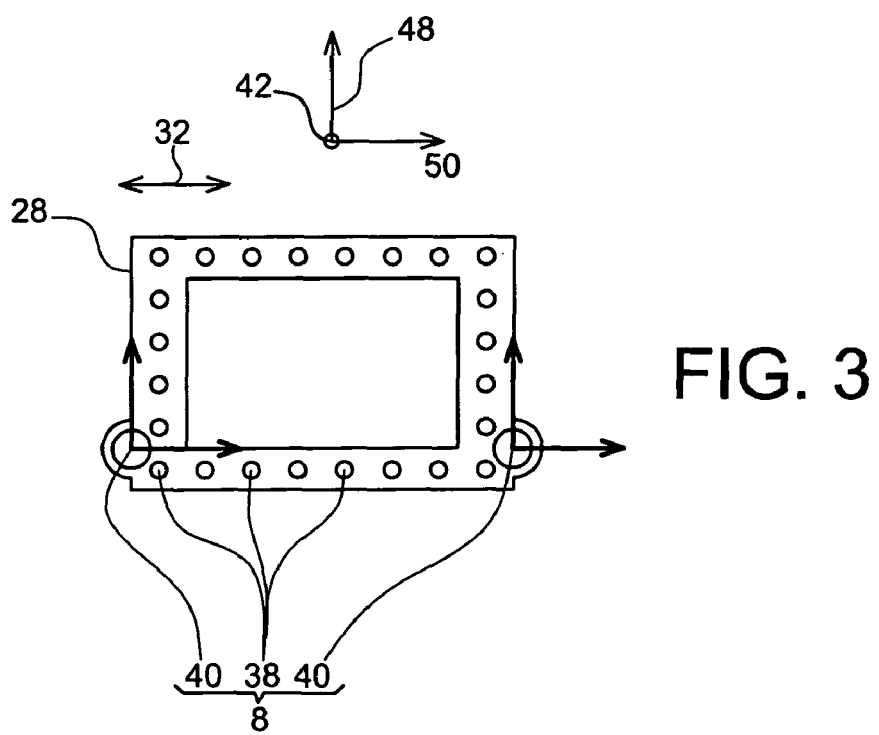
FIG. 3 shows a sectional view taken along line III-III in FIG. 2.

In the first preferred embodiment shown in FIGS. 1 to 3, the element 28 is not only bearing on the spar 34, but also in contact with it. In FIG. 1, it can be seen that all or practically all of the external surface of the closing element 28 is in contact with the forward surface of the spar 34, which suggests that this entire element 28 is arranged in the wing element 2. More precisely, this element 28 is arranged in a part said to form the leading edge of the wing element, which is delimited near the aft direction by the spar 34 also forming a forward limit of a main part forming the box of this wing element.

Nevertheless, it would also be possible for this outside surface of the element 28 to extend downwards beyond the spar 34 and therefore under the intrados 36 of the wing 2, without going outside the framework of the invention and that will be described in detail with reference to the second and third preferred embodiments.

Furthermore, in the first preferred embodiment, the attachment of the rigid structure 6 onto the wing 4 may be consolidated with reinforcements or similar elements belonging to this same structure 6 and being connected to support means (not shown) projecting below the intrados 36, and preferably being fixed to the forward spar 34.

However, in the configuration shown for this first embodiment and as can be seen in FIGS. 2 and 3, the only fastening means provided between the closing element 28 and the forward spar 34 are a plurality of tension bolts 38, and two lateral shear pins 40. More precisely, these mounting means 8 preferably have a symmetry about a vertical plane parallel to a direction 42 orthogonal to the width direction 32 and therefore comprise two shear pins 40 arranged on each side of this plane (not shown), these pins 40 also being arranged along this direction 42 and therefore each of them being capable of resisting forces applied along a first and a second directions orthogonal to each other and also orthogonal to the direction 42. Note also that the above-mentioned vertical plane also preferably forms a plane of symmetry for the closing element 28.

The mounting means 8 also comprise tension bolts 38 also arranged in the direction 42 along which a plurality of force loading ribs 44 of wing 2 extends, some of these bolts 38 therefore being located so as to pass not only through the element 28 and the spar 34, but also through a forward part of a rib 44. As can be seen in FIG. 3, these bolts 38 are preferably arranged on a peripheral part of the closing element 28, all around this element, and are therefore capable of resisting forces applied along the direction 42. Finally, note that the bolts 38 are assembled with a radial clearance, to obtain mounting means 8 forming a statically determinate mounting system.

With this arrangement, forces applied along the first direction 48 (in this case identical to the Z direction) and along the second direction 50 (in this case identical to the width direction 32) are resisted only by the two pins 40, while the forces applied along the direction 42 are resisted exclusively by the plurality of bolts 38. Furthermore, the moment applied along the direction 42 is resisted jointly by the two pins 40, and moments applied about the two directions 48 and 50 are resisted jointly by the tension bolts 38.

Figure 4:
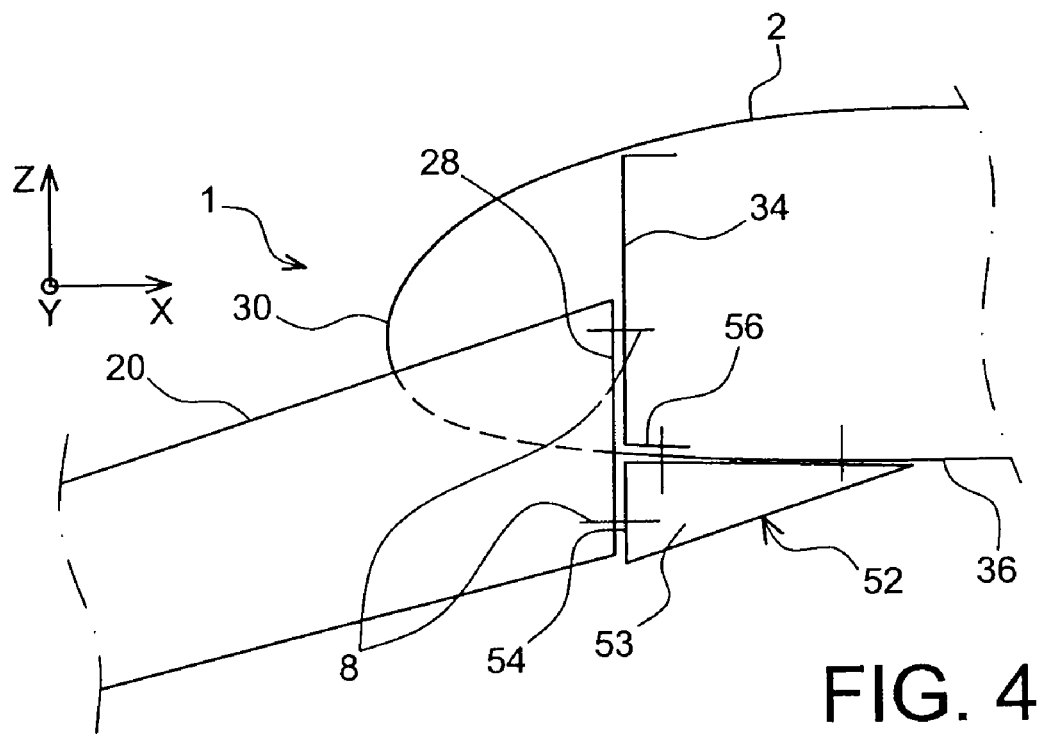
FIG. 4 shows a side view of an assembly for an aircraft according to a second preferred embodiment of this invention.

With reference to FIG. 4, the figure shows an assembly 1 for an aircraft according to a second preferred embodiment of this invention. Note that in the figures, the elements marked with the same numeric references correspond to identical or similar elements.

Thus, it can be seen that the difference from the first embodiment consists of assuring that the aft closing element 28 is not only fixed on the forward spar 34 but also on a support fitting 52 located below the spar 34. This fitting 52, preferably provided with reinforcing ribs 53, has a contact area 54 located outside the wing 2 and along the extension of the forward surface of the spar 34, this surface 54 being arranged such that the element 28 can also bear in contact with it. For guidance, this support fitting 52 is entirely added on under the intrados 36 to which it may be fixed through conventional mounting means, also enabling assembly of this fitting 52 onto a lower wing 56 of the forward spar. Furthermore, mounting means 8 identical or similar to those described above are therefore distributed on the forward spar 34 and on the support fitting 52.

Therefore, in this second embodiment and in the other described embodiments, the entire rigid structure 6 of the pylon 4 is preferably forwards from the forward spar 34 of the wing 2.

Figure 5:
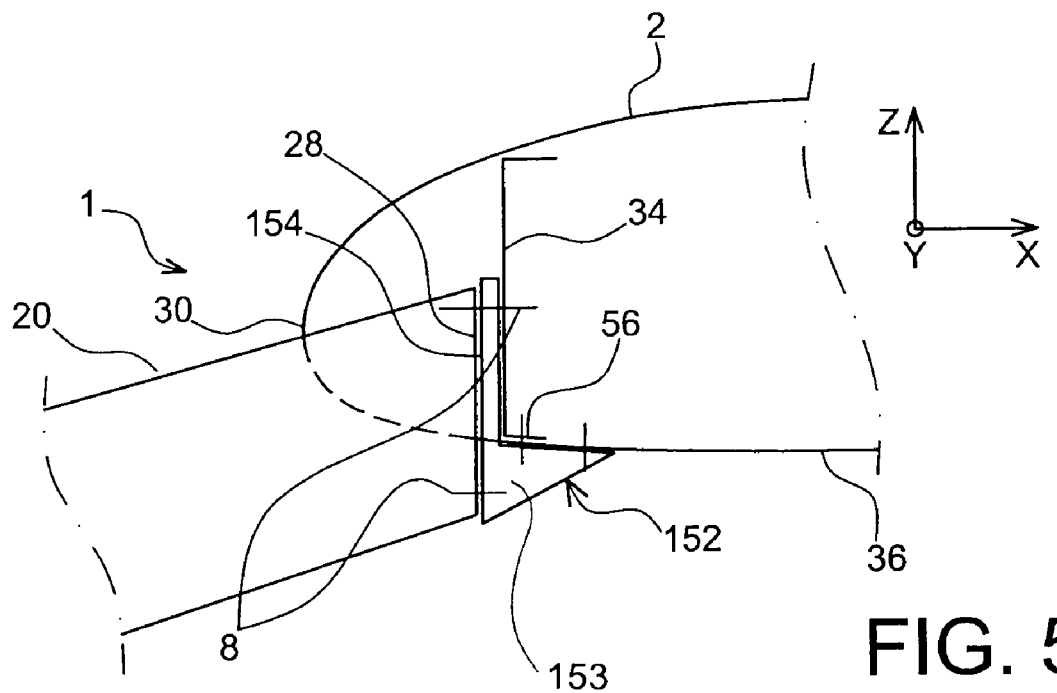
FIG. 5 shows a side view of an assembly for an aircraft according to a third preferred embodiment of this invention.

With reference to FIG. 5, the figure shows an assembly 1 for an aircraft according to a third preferred embodiment of this invention. In this mode, there is a support fitting 152 preferably provided with reinforcing ribs 153, and for which the lower part located outside the wing 2 is identical to or similar to the support fitting 52 described in the context of the second embodiment, and an upper part located outside the wing 2 is inserted between the forward spar 34 and the closing element 28. Thus, this final element 28 that is still bearing in contact with the spar 34 without being directly in contact with it, is consequently entirely in contact with a bearing surface 154 of the fitting 152, this surface 154 and the element 28 then being partially inside and partially outside the wing 2.

In this configuration in which the contact surface 154 extends substantially over the entire height of the fitting 152 preferably made from a single piece made of titanium, note that this surface is preferably parallel to the forward surface of the spar 34, in other words is oriented substantially in the vertical direction parallel to the leading edge. The lower part of the fitting 152 can also be connected to the intrados 36 and to the lower wing 56 of the spar through the conventional assembly means, while its upper part is fixed to the web of the spar 34 using mounting means 8 passing through the assembly means, in order to cooperate with this same web.

Obviously, various modifications can be made by those skilled in the art to the assemblies 1 for an aircraft that have just been described, solely as non-limitative examples.

The invention claimed is:

1. An assembly for an aircraft comprising a wing element and a suspension pylon for an engine under said wing element, the suspension pylon comprising a rigid structure forming a box provided with an aft closing element, and the wing element having a forward spar extending substantially parallel to a leading edge of said wing element, wherein the rigid structure is assembled on the wing element such that the aft closing element bears in contact with said forward spar of the wing element, said rigid structure partially penetrating inside said wing element, wherein said box includes an upper spar, a lower spar and two side panels, wherein said upper and lower spars and said two side panels are connected to each other by transverse ribs, and wherein said closing element is connected to said upper and lower spars and to said two side panels at an aft end of the box so as to at least partially close said box at said aft end of the box, wherein the aft closing element bears in contact with said forward spar of the wing element over the entire outside surface of said aft closing element.

2. An assembly for an aircraft comprising a wing element and a suspension pylon for an engine under said wing element, the suspension pylon comprising a rigid structure forming a box provided with an aft closing element, and the wing element having a forward spar extending substantially parallel to a leading edge of said wing element, wherein the rigid structure is assembled on the wing element such that the aft closing element bears in contact with said forward spar of the wing element, said rigid structure partially penetrating inside said wing element, wherein said box includes an upper spar, a lower spar and two side panels, wherein said upper and lower spars and said two side panels are connected to each other by transverse ribs, and wherein said closing element is connected to said upper and lower spars and to said two side panels at an aft end of the box so as to at least partially close said box at said aft end of the box, wherein said closing element is a plate that entirely closes said box, wherein the aft closing element bears in contact with said forward spar of the wing element over the entire outside surface of said aft closing element.

3. An assembly according to claim 2, further comprising mounting means for fastening the aft closing element onto the wing element, said mounting means comprising two lateral shear pins and a plurality of tension bolts.

4. An assembly for an aircraft comprising a wing element and a suspension pylon for an engine under said wing element, the suspension pylon comprising a rigid structure forming a box provided with an aft closing element, and the wing element having a forward spar extending substantially parallel to a leading edge of said wing element, wherein the rigid structure is assembled on the wing element such that the aft closing element bears in contact with said forward spar of the wing element, said rigid structure partially penetrating inside said wing element, wherein said box includes an upper spar, a lower spar and two side panels, wherein said upper and lower spars and said two side panels are connected to each other by transverse ribs, and wherein said closing element is connected to said upper and lower spars and to said two side panels at an aft end of the box so as to at least partially close said box at said aft end of the box, wherein said rigid structure and said wing element are connected to each other solely by said closing element.

5. An assembly according to claim 4, further comprising at least one forward engine attachment connecting a forward end of said rigid structure to said engine, at least one aft engine attachment connecting an aft end of said rigid structure to said engine, and a thrust resistance device connecting said at least one forward engine attachment to said at least one aft engine attachment.

6. An assembly according to claim 5, wherein said thrust resistance device extends between said box and said engine.

* * * * *